US010458106B2

(12) United States Patent
Benesh et al.

(10) Patent No.: US 10,458,106 B2
(45) Date of Patent: Oct. 29, 2019

(54) WATERLESS TRAP

(71) Applicant: Zurn Industries, LLC, Milwaukee, WI (US)

(72) Inventors: Michael T. Benesh, Erie, PA (US); Jason E. Morris, Erie, PA (US); William E. Verdecchia, Erie, PA (US); Donald J. Bissell, Erie, PA (US)

(73) Assignee: ZURN INDUSTRIES, LLC, Milwaukee, WI (US)

( * ) Notice: Subject to any disclaimer, the term of this patent is extended or adjusted under 35 U.S.C. 154(b) by 36 days.

(21) Appl. No.: 15/338,684

(22) Filed: Oct. 31, 2016

(65) Prior Publication Data

US 2017/0121953 A1    May 4, 2017

Related U.S. Application Data

(60) Provisional application No. 62/249,576, filed on Nov. 2, 2015.

(51) Int. Cl.
*E03C 1/298* (2006.01)
*F16K 15/14* (2006.01)
*E03F 5/04* (2006.01)

(52) U.S. Cl.
CPC ............. *E03C 1/298* (2013.01); *E03F 5/041* (2013.01); *F16K 15/148* (2013.01);
(Continued)

(58) Field of Classification Search
CPC .......... E03C 1/298; E03C 1/1225; E03C 1/22; E03C 1/28; E03C 1/281; E03C 1/294;
(Continued)

(56) References Cited

U.S. PATENT DOCUMENTS 851,182 A * 4/1907 Rowbotham ........... F16K 29/00
137/331
1,523,910 A * 1/1925 Sims ..................... F16K 15/025
137/331
(Continued)

FOREIGN PATENT DOCUMENTS

WO    WO-9214888 A1 *  9/1992  ............... E03C 1/22

OTHER PUBLICATIONS

"Vortex" in Merriam-Webster Online Dictionary, <https://www.merriam-webster.com/dictionary/vortex>, archival version as of Apr. 25, 2009, retrieved from Internet Archive Wayback Machine <https://web.archive.org/web/20090425174251/https://www.merriam-webster.com/dictionary/vortex> on Oct. 10, 2018.*

*Primary Examiner* — Mary E McManmon
*Assistant Examiner* — Richard K. Durden
(74) *Attorney, Agent, or Firm* — Michael Best & Friedrich LLP

(57) ABSTRACT

A waterless trap for use in a drain assembly includes flow enhancing features to promote the vortex water flow of water received in the trap, an improved sealing arrangement to enhance the seal between a seal member and the housing to inhibit sewer gas leaks from an attached drain pipe by maintaining an evaporation barrier that assists in retaining water in a corresponding p-trap, and a plurality of air passages can allow the trap seal to open with ease when the drain pipe is pressurized. These features may be used in combination with one another or may be independently employed.

6 Claims, 9 Drawing Sheets

(52) U.S. Cl.
CPC ..... *E03F 5/0407* (2013.01); *E03F 2005/0417* (2013.01); *Y10T 137/789* (2015.04); *Y10T 137/7847* (2015.04); *Y10T 137/7866* (2015.04)

(58) Field of Classification Search
CPC ...... E03D 13/007; E03F 5/0407; E03F 5/041; E03F 2005/0417; F16K 15/148; F16K 24/04; F16K 24/06; F16K 25/00; F16K 15/145; Y10T 137/6253; Y10T 137/6988; Y10T 137/7847; Y10T 137/7849; Y10T 137/7859; Y10T 137/7861; Y10T 137/7862; Y10T 137/7866; Y10T 137/7867; Y10T 137/7879; Y10T 137/7888; Y10T 137/789; Y10T 137/7896; Y10T 137/7933
USPC ............. 137/331, 362, 513.3, 513.7, 516.11, 137/516.15, 516.17, 516.25, 516.27, 543, 137/843, 852, 854, 860
See application file for complete search history.

(56) References Cited

U.S. PATENT DOCUMENTS

| | | | | |
|---|---|---|---|---|
| 1,555,804 A | * | 9/1925 | Konar | F01L 1/28 123/188.2 |
| 1,718,350 A | * | 6/1929 | Greenwald | F16K 1/2085 137/516.27 |
| 2,494,679 A | * | 1/1950 | Ward, Jr. | F16K 24/04 220/288 |
| 2,671,466 A | * | 3/1954 | Conrad | F16K 15/142 137/512.3 |
| 2,912,999 A | * | 11/1959 | Kersh | F16K 15/148 137/512.4 |
| 3,077,896 A | * | 2/1963 | Weingard | F16K 1/14 137/329.06 |
| 3,363,644 A | * | 1/1968 | Malec | F16K 15/142 137/515 |
| 3,497,395 A | * | 2/1970 | Kohen | F16K 17/0446 137/860 |
| 4,549,565 A | * | 10/1985 | Short, III | F16K 15/142 137/516.15 |
| 6,105,610 A | * | 8/2000 | Watkins, II | F16K 15/04 137/516.29 |
| 6,719,004 B2 | | 4/2004 | Huber et al. | |
| 7,900,288 B2 | | 3/2011 | Fima | |
| 9,010,363 B2 | | 4/2015 | Huber | |
| 9,027,172 B2 | | 5/2015 | Fima | |
| 9,139,991 B2 | | 9/2015 | Huber | |
| 9,416,986 B2 | | 8/2016 | Huber | |
| 2006/0260703 A1 | * | 11/2006 | Johnson | A61M 16/0468 137/854 |
| 2007/0056093 A1 | * | 3/2007 | Havens | E03C 1/284 4/679 |
| 2007/0215212 A1 | * | 9/2007 | Demeniuk | E03F 5/042 137/362 |
| 2010/0192295 A1 | * | 8/2010 | Fima | E03D 13/00 4/679 |
| 2012/0228873 A1 | * | 9/2012 | Steele | B65D 75/5877 285/399 |
| 2015/0300511 A1 | | 10/2015 | Fima | |
| 2016/0213208 A1 | | 7/2016 | Landon | |
| 2016/0213210 A1 | | 7/2016 | Landon | |
| 2016/0215483 A1 | | 7/2016 | Landon | |
| 2016/0215895 A1 | | 7/2016 | Landon | |

* cited by examiner

WATERLESS TRAP

CROSS-REFERENCE TO RELATED APPLICATION

This application claims the benefit of U.S. Provisional Patent Application No. 62/249,576 filed Nov. 2, 2015, the contents of which are incorporated by reference herein in their entirety for all purposes.

STATEMENT OF FEDERALLY SPONSORED RESEARCH OR DEVELOPMENT

Not applicable.

TECHNICAL FIELD

This disclosure relates to traps for drains and, more particularly, to waterless traps for floor drains.

BACKGROUND

Floor drains are installed in the low points of floors to collect and provide a drain passage for fluid. Such floor drains are typically connected to a drain pipe that may connect to further downstream sewage lines.

In most conventional floor drains, a p-trap is used to prevent sewer gas from escaping from the plumbing system into the room via the floor drain opening. The p-trap is installed between the drain opening and the downstream drain or sewage line and includes a U-shaped section of tube that dips and then rises. To form a gas seal between the drain or sewage line and the opening for the floor drain, water is received in the U-shaped section of the p-trap to fill the tube and create at least one segment of tube through which sewer gas cannot readily pass because it is filled with water.

However, since some drains are used infrequently, the water in the p-trap can tend to dry up. When the water level decreases as the result of evaporation, the gas seal can be destroyed and sewer gas can be allowed to escape which may cause discomfort to the building occupants and potential health hazards should the gas enter the ventilation system.

To avoid the problems associated with the water evaporation in p-traps, waterless traps have been designed which can be used in conjunction with p-traps to inhibit evaporation of fluid in the p-trap. One such waterless trap is described in U.S. Pat. No. 9,027,172. Traps of this type may contain downwardly-angled frusto-conical seal members that are gently biased against a circumferential seat to form a seal. To accommodate drainage of water through the trap, water is able to pass downwardly between the seal member and the seat when the seal member deflects slightly downward under the weight of the water. However, when gas from the connected drain pipe attempts to escape upwardly through the trap, the formed seal prevents gas flow.

Traditional waterless traps have not always performed as robustly as desired. Among other things, if good contact is not made at the seal line—which can occur if the seal member is misaligned—then a small gap could form that permits the fluid in the p-trap to evaporate more quickly and potentially result in the unintended escape of sewer gas. To attempt to remedy this and improve the seal, some trap designs employ multiple frusto-conical seal members and multiple seats. However, this approach adds expense to the design by adding duplicative components. Further, when used in a floor drain, this additional height may be unacceptable because of the thickness of the floor.

Still yet, there are instances in which the seal in a waterless trap does not open as readily or easily as desired during water drainage. This may occur because of the manner in which water enters and collects in the trap and/or may occur because pressure in the drain pipe makes it difficult for the trap seal to be overcome, even with the collection of water on top of the seal member.

SUMMARY

Disclosed herein is a waterless trap employing various features that assist in overcoming these shortcomings of existing waterless trap designs. The disclosed waterless trap can include one or more flow enhancing features described herein. In some embodiments, two or more blades may promote vortex water flow of water received in the trap. In some embodiments, an improved sealing arrangement to enhance the seal between a seal member and the housing when water is not draining may be provided, which may inhibit evaporation of water from the p-trap (and therefore potential sewer gas leaks from an attached drain pipe). Still yet some embodiments may comprise one or more air passages that may allow the trap seal to open with ease when the drain pipe is pressurized (and when water is draining). Again, it should be appreciated that these features may be used in combination with one another or may be independently employed.

According to one aspect, a waterless trap includes a housing and a seal member. The housing has an outer peripheral wall with a lower peripheral lip including a plurality of sealing teeth. The housing further has a central post and a plurality of blades extending from the outer peripheral wall to the central post. The seal member has a stem received on the central post of the housing and a skirt extending radially outward and downwardly from the stem. The skirt contacts the plurality of sealing teeth of the lower peripheral lip of the housing to form a corresponding plurality of seals therebetween. Among other things, this may provide an improved seal to prevent leakage of gas past the seal when draining is not occurring.

According to another aspect, a waterless trap includes a housing having an outer peripheral wall and a plurality of blades that extend radially inward from the outer peripheral wall to a central post which extends axially through the housing. Each of the plurality of blades have an upper surface that is sloped downward in an angular direction about a central axis of the housing. Again, the waterless trap includes a seal member having a stem received on the central post of the housing and a skirt extending radially outward and downwardly from the stem. The skirt contacts a lower peripheral lip of the housing to form a seal therebetween. This blade arrangement may provide a more directed flow of water in the trap and may assist in creating a vortex flow pattern.

According to still another aspect, a waterless trap includes a housing having an outer peripheral wall and a radially inward facing wall. The housing further has a central post and a plurality of blades extending from the outer peripheral wall to the central post. The waterless trap also includes a seal member having a stem received on the central post of the housing and a skirt extending radially outward and downwardly from the stem in which the skirt contacts the radially inward facing wall of the housing to form a seal therebetween. The central post has at least one air exchange passage formed therein for selectively fluidly connecting a volume of the housing below the seal member to a volume of the housing above the seal member. The at least one air exchange passage may permit some small amount of gas to be released from the volume below the trap and above the water line in the p-trap, thereby permitting the seal to be more readily overcome in a drainage situation rather than potentially having the seal stick and water collect in the trap.

In some forms, an inwardly facing wall of the stem of the seal member may provide a portion of at least one air passage. In this case, an O-ring may be received around an upper outlet of at least the one air exchange passage to establish a seal at the at least one corresponding upper outlet, although in some preferred forms, the O-ring may be omitted.

In some forms, the at least one air exchange passage may be a central air passage defined by an aperture extending axially through the central post from a top surface of the central post to a lower extent of the central post. In this case, the waterless trap may further comprise a cap configured to receive a portion of the central post and be positioned to inhibit liquid flow from the volume of the housing above the seal member to the volume of the housing below the seal member. In some embodiments, the central post may further comprise one or more escape ports that extend radially outward from the central air passage and can be positioned in fluid communication with the central air passage.

In some embodiments, the at least one air exchange passage includes a plurality of air exchange passages.

These and still other advantages of the invention will be apparent from the detailed description and drawings. What follows is merely a description of some preferred embodiments of the present invention. To assess the full scope of the invention, the claims should be looked to as these preferred embodiments are not intended to be the only embodiments within the scope of the claims.

DETAILED DESCRIPTION

Referring first to FIGS. 1-4, a waterless trap 10 is illustrated which is configured to be received in a drain opening having a generally circular shape. A waterless trap 10 of this kind is typically used in conjunction with a p-trap and the waterless trap 10 helps to form a seal above the liquid in the p-trap that serves as an evaporation barrier. Because the waterless trap 10 may at least partially inhibit the evaporation of the fluid in the p-trap, it correspondingly helps to maintain the liquid barrier in the p-trap a longer duration of time. Additionally, it may prevent gas from an attached drain or sewer line from passing upwardly through the drain opening and into the room. However, the waterless trap 10 still permits the flow of water downwardly through the drain past the seal in the trap 10 and into the p-trap region of the drain.

Figure 1:
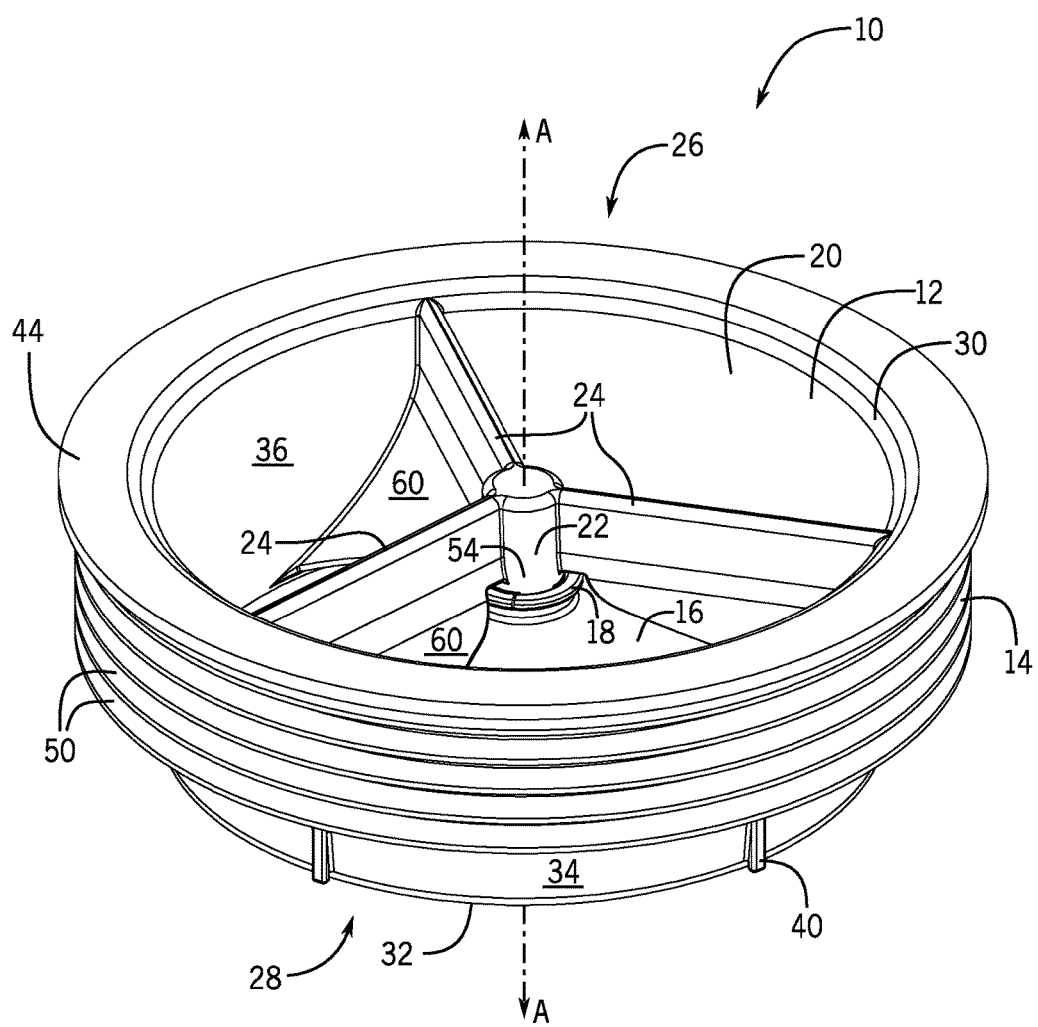
FIG. 1 is a top perspective view of a waterless trap.

In the illustrative embodiments, the waterless trap 10 includes a housing 12, a gasket 14, and a seal member 16. Some embodiments further include an O-ring 18, although in some instances the O-ring may be omitted. The housing 12 is best illustrated apart from the assembly in the exploded view of FIG. 2, although parts of the housing 12 can be seen in the various views. Generally speaking, the housing 12 has an outer peripheral wall 20 which, in the form shown, extends about a central axis A-A of the housing 12, which is the shared central axis of the waterless trap 10 when all the components are assembled as shown in FIG. 1. The housing 12 also includes a central post 22 extending along this central axis A-A and further includes a plurality of blades 24 extending from the outer peripheral wall 20 to the central post 22. In the particular forms illustrated, the various components of the housing 12 are integrally formed with one another, meaning that the materials from which the respective structures are formed are continuous and uninterrupted with one another. However, it will be appreciated that, in other forms, the housing might be constructed from separate assembled components. For example, the outer peripheral wall, the blades, and/or the central post may be separately formed and assembled together to form the housing.

In the form shown, the outer peripheral wall 20 is generally tubular in form and tapers radially inward as it extends from an upper side 26 of the trap 10 to a lower side 28 of the trap. If a cross-section was taken through the outer peripheral wall 20 in a direction perpendicular to the central axis A-A, the portion of the cross-section would be generally circular in shape.

The outer peripheral wall 20 has an upper peripheral lip 30, a lower peripheral lip 32, a radially outward facing wall 34, and a radially inward facing wall 36. The radially outward facing wall 34 includes a first plurality of circumferentially-spaced and axially-extending ribs 38 which extend from the upper peripheral lip 30 to a spot midway down the radially-outward facing wall 34 (which may be surrounded by the gasket 14, as described in more detail below) and further includes a second plurality of circumferentially-spaced and axially-extending ribs 40 which extend from the lower peripheral lip 32 to a spot midway up the radially-outward facing wall 34. In the particular form illustrated, at a particular circumferential position there is one rib from either the first group of ribs 38 or the second group of ribs 40, but not both. However, it should be appreciated that different rib orientations may be used, such that a particular circumferential position may have no ribs at a location, or multiple ribs at the same location, where ribs may overlap. Further, in some embodiments, the radial-outward facing wall 34 may not have any axially-extending ribs 38 or 40.

In some embodiments, the first plurality of circumferentially-spaced axially-extending ribs 38 may have the same width as the second plurality of circumferentially-spaced axially extending ribs 40. However, in other embodiments, the rib sizes may vary. For example, each rib in the second plurality of circumferentially-spaced axially-extending ribs 40 may have a width that is wider than each of the ribs in the first plurality of circumferentially-spaced axially-extending ribs 38. Additionally, it should be understood that although the illustrative embodiment shows the first plurality of circumferentially-spaced axially-extending ribs 38 including more ribs than the second plurality of circumferentially-spaced axially-extending ribs 40, the quantity of ribs in each plurality may be changed such that ribs 40 outnumber ribs 38. It should also be appreciated that although each rib in the first plurality of circumferentially-spaced axially-extending ribs 38 is shown as being a uniform size, the size of each individual rib may vary, in both width, length, and depth. Similarly, the dimensions of each rib in the second plurality of circumferentially-spaced axially-extending ribs 40 may be uniform or may vary dimensionally throughout.

Figure 2:
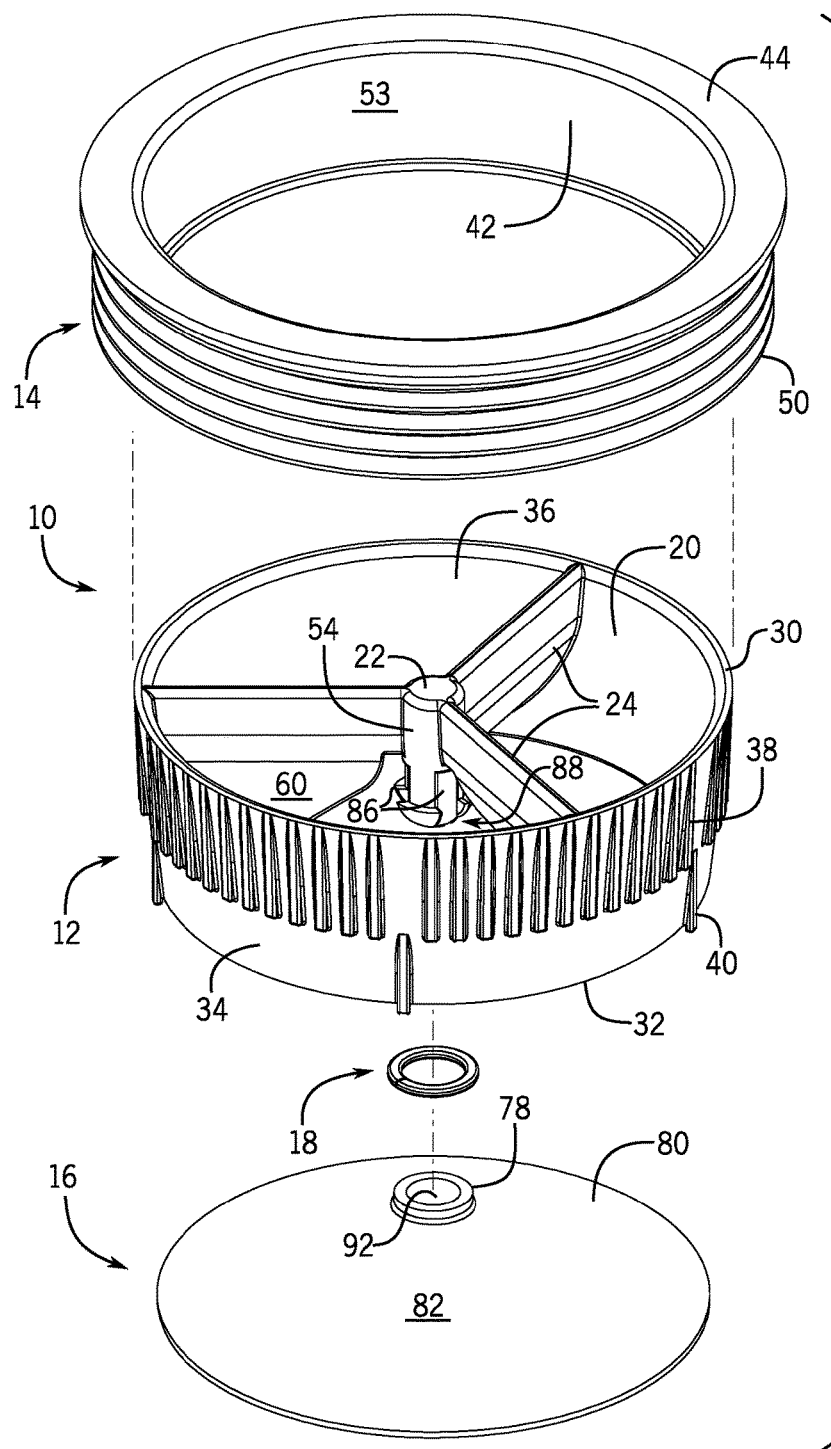
FIG. 2 is an exploded perspective view of the waterless trap of FIG. 1, illustrating a gasket, a housing, an O-ring, and a seal member.

The gasket 14 is a generally ring-like or annular structure that is best shown apart from the trap 10 in FIG. 2 and can be made of an elastomeric material or other flexible materials suitable for use in a sealing application. The gasket 14 has a generally tubular wall 42 with an upper flange 44 extending both radially inward and outward from the wall 42 and with a lower flange 46 that extends radially inward. On a radially-outward facing surface 48 of the generally tubular wall 42 of the gasket 14, there are a plurality of circumferentially extending fins 50, while the radially-inward facing surface 52 is generally a flat cylindrical surface.

Figure 3:
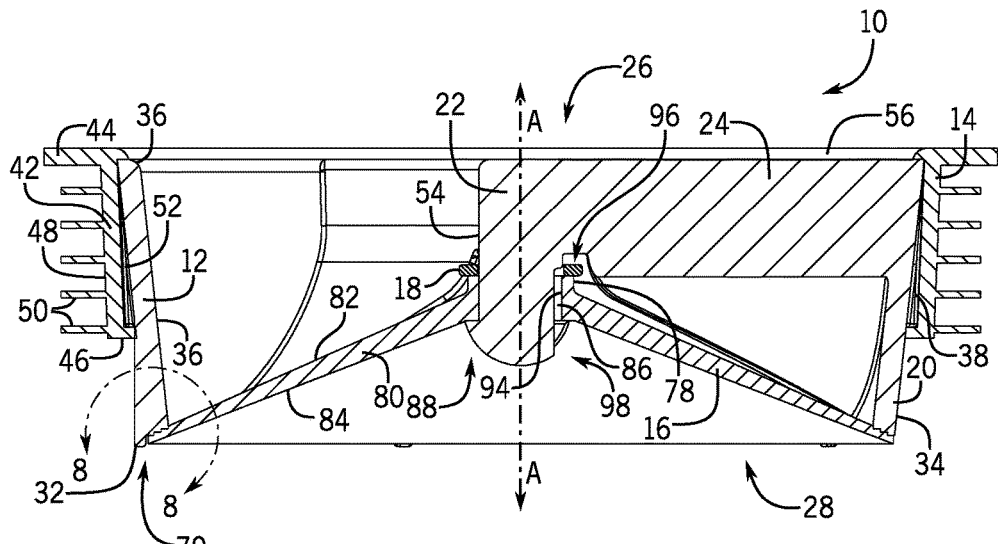
FIG. 3 is a cross-sectional side view of the waterless trap taken along line 3-3 of FIG. 4.
Figure 4:
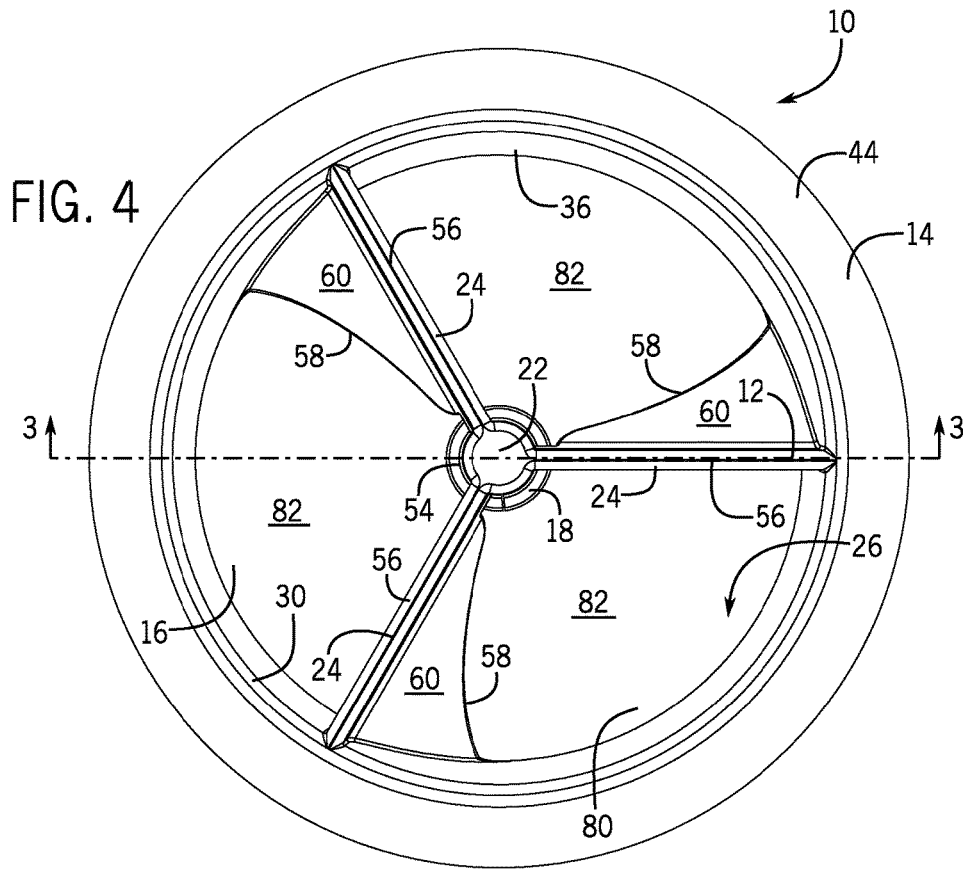
FIG. 4 is a top plan view of the waterless trap.

To assemble the gasket 14 to the housing 12 as best shown in the cross-section of FIG. 3 (but as also shown in FIGS. 1 and 4), the gasket 14 is received over the top end of the housing 12 and around the radially-outward facing wall 34 of the outer peripheral wall 20 of the housing 12. This may involve some elastic deformation of the gasket 14 as it is stretched to be received over the top end of the housing. The gasket 14 is moved downward on the housing 12 until the radially-inward facing portion of the upper flange 44 of the gasket abuts the upper peripheral lip 30 of the outer peripheral wall 20 of the housing 12. In this position, the lower flange 46 of the gasket 12 wraps over the lower end of the first set of ribs 38 to axially capture the gasket 14 in place. The first set of ribs 38 also can abut the radially-inward facing surface 52 of the gasket 14. This may allow the wall 42 to retain form and may create some mild interference between the gasket 14 and the housing 12 so that the gasket 14 is well-retained on the housing 12 once they are assembled to one another.

With the gasket 14 in place around the housing 12 (and after the seal member 16 and the O-ring 18, if present, have been installed in the housing 12 as will be described below), the gasket 14 assists in placing the water trap 10 in a drain (not shown). The gasket 14 of the trap 10 is received in the opening of the drain such that the fins 50 contact a radially-inward facing surface of the line or pipe in which the drain is installed to help center the trap 10 in the line. The radially-outward extending portion of the upper flange 44 can abut an upper surface of the drain to limit axial insertion depth of the trap 10.

Figure 5:
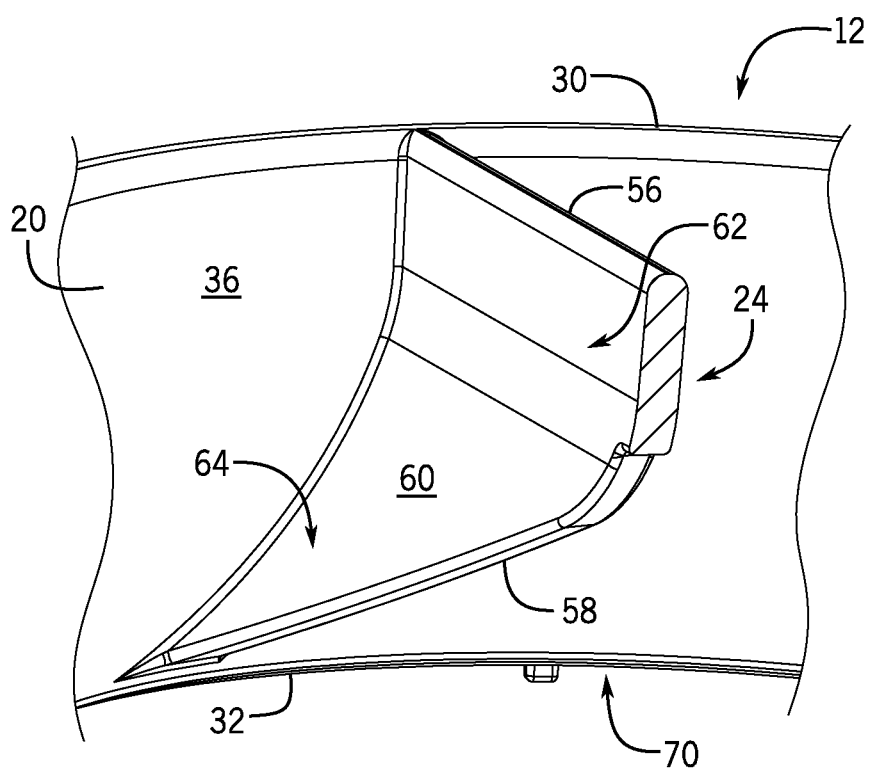
FIG. 5 is a partial top front perspective view of the housing illustrating one of the water blades.
Figure 6A:
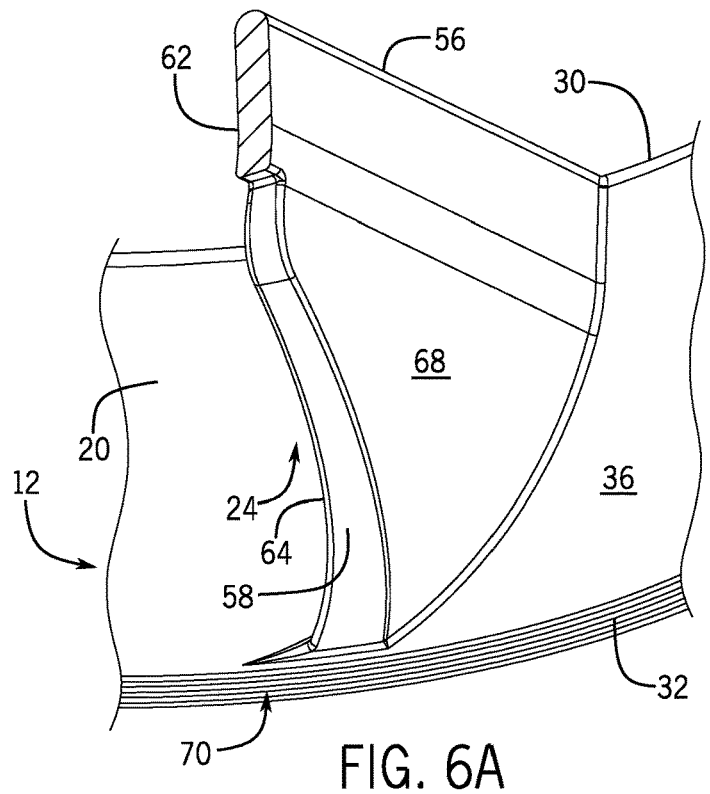
FIG. 6A is a partial rear bottom perspective view of the water blades of FIG. 5.
Figure 6B:
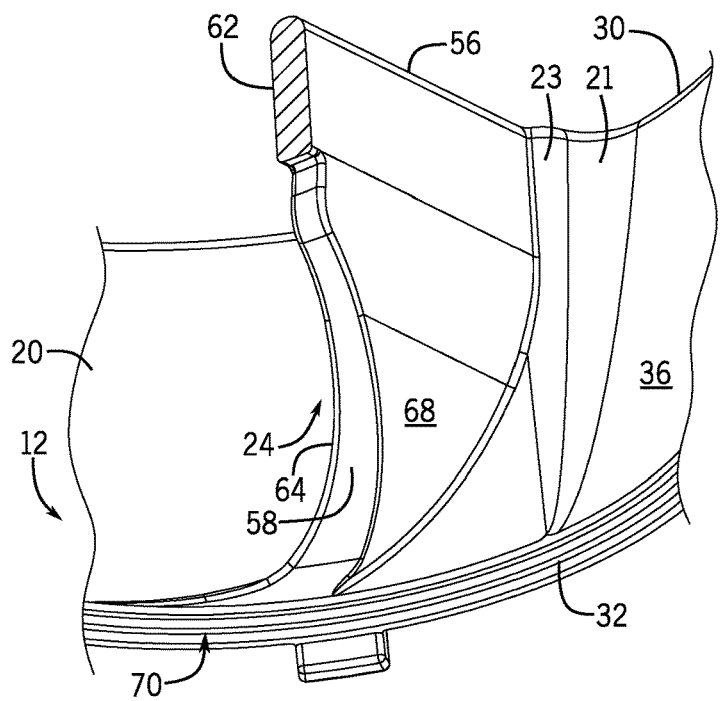
FIG. 6B is a partial rear bottom perspective view of the water blades in a second embodiment of the housing.

Now returning to the description of the housing 12 and with additional reference to FIGS. 5, 6A, and 6B, one exemplary design of the plurality of blades 24 of the housing 12 is illustrated in greater detail. As described above, the plurality of blades 24 extend from the outer peripheral wall 20 to the central post 22 and, more specifically, from the radially-inward facing wall 36 of the outer peripheral wall 20 to a radially-outward facing wall 54 of the central post 22. While a single blade is illustrated in FIGS. 5, 6A, and 6B, all of the three blades 24 in the illustrated housing 12 may have a profile similar to this single blade. It should be appreciated that while three blades are illustrated, it is contemplated other numbers of blades (for example, two, four, five, or more), might be employed.

The blades 24 extend both vertically and angularly from a straight top edge 56 to a curved lower edge 58 and an upper surface 60 that is sloped downward in an angular direction about the central axis A-A of the housing 12. The profile of the curved lower edge 58 reflects, in part, the profile of the seal member 16 which will be located directly beneath the blades 24 in the assembled waterless trap 10. As can be best seen from the intersection of where the blade 24 connects to the radially-inward facing wall 36 of the outer peripheral wall 20, travelling from the top to the bottom of the upper surface 60 of the blade 24, the upper surface 60 initially has a steep section 62 which is nearly purely vertical in direction and gradually angularly slopes in a sloped section 64 that is partially concave in form. Given this geometry, as each of the blades 24 extend radially away from the central post 22 to the outer peripheral wall 20, an angular extent of each of the plurality of water blades increases as best illustrated in the top view of FIG. 4.

While the illustrated blades 24 show angularly curved surfaces, it should be appreciated that, in other forms, the blades may extend only vertically from a straight top edge 56 or may take on other shapes or geometries.

Additionally, as can be seen in FIGS. 6A and 6B, because the blade 24 is of approximately constant thickness, the back or lower surface 68 of the blade 24 can have a form generally corresponding to the upper surface 60, albeit on the underside of the blade 24. While it is not strictly required that the upper surface 60 and the lower surface 68 match one another, the fact that the lower surface 68 creates a volume below the blade 24 can potentially be beneficial because it provides additional space for water directed by the adjacent blade to flow on the top side of the trap (that is, above the seal member 16).

Although the back or lower surface 68 of the blade 24 is shown extending away from the radially-inward facing wall 36 at about approximately a right angle in FIG. 6A, it should be appreciated that other geometries may be incorporated. In some embodiments, the back or lower surface 68 of the blade extends away from a rounded edge, such as a concave surface 21 or fillet, shown in FIG. 6B. In some embodiments, the back surface 68 of the blade may extend away from a joint that includes both a concave section 21 and a convex section 23. These sections may be provided to further direct flow both inwardly and circumferentially to promote a vortex flow.

In contrast to traditional blades which may only provide structural support for holding a central post and extend purely vertically, the illustrated blades 24 provide flow control features and can specifically help to create a vortex flow for the water entering the trap 10. Effectively, water entering the top of the trap is directed at least in part in an angular direction about the central axis A-A when the water contacts the upper surface 60 of the blades 24. However, traditional blades that do not incorporate these flow control features may also be utilized in various embodiments of the present disclosure, as they are suitable for use in many applications.

Figure 7:
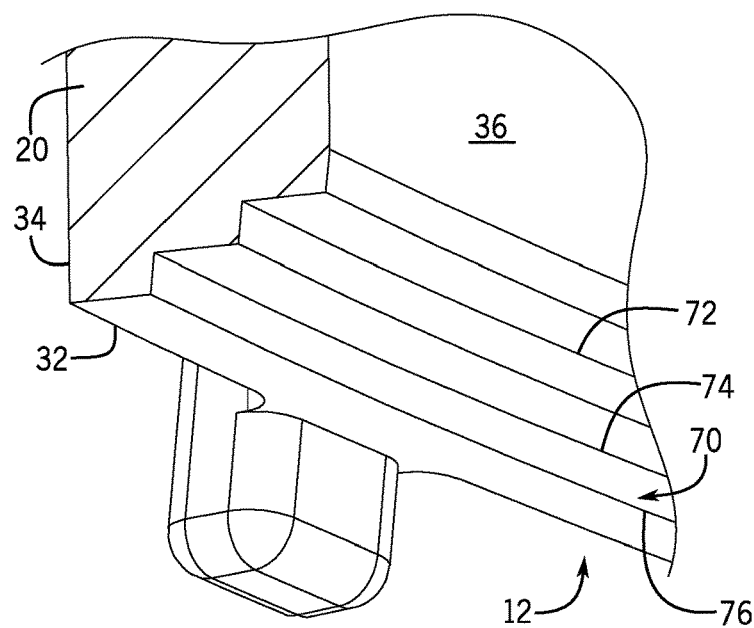
FIG. 7 is a detailed bottom perspective view of a lower peripheral lip of the sectioned housing of the waterless trap in which the three sealing teeth of the lower peripheral lip are illustrated.

With additional reference now being made to FIG. 7, a plurality of sealing teeth 70 at the lower peripheral lip 32 of the housing 12 is illustrated. In the particular form illustrated there are three circumferential steps 72, 74, and 76 which extend entirely around the circumference of housing 12.

Taking a moment to refer back to FIG. 2, these sealing teeth 70 are designed to be engaged by the seal member 16. This seal member 16 includes a stem 78 which is received on a lower portion of the central post 22 of the housing 12 and a skirt 80 extending radially outward and downwardly from the stem 78 which is placed in contact against the sealing teeth 70 of the lower peripheral lip 32 of the housing to form a seal therebetween which can prevent the escape of gas upwardly through the trap 10 and maintain an evaporation barrier between the trap 10 and the p-trap. The skirt 80 is frusto-conically shaped and has an upper surface 82 and a lower surface 84 which are both frusto-conical and which taper to become thinner at greater radial distances from the central axis A-A. The seal member 16 can be made of an elastomeric or other polymeric material such as silicone to permit the stem 78 to be received on the central post 22 of the housing 12 and to permit some elastic flexure of the skirt 80.

Figure 8:
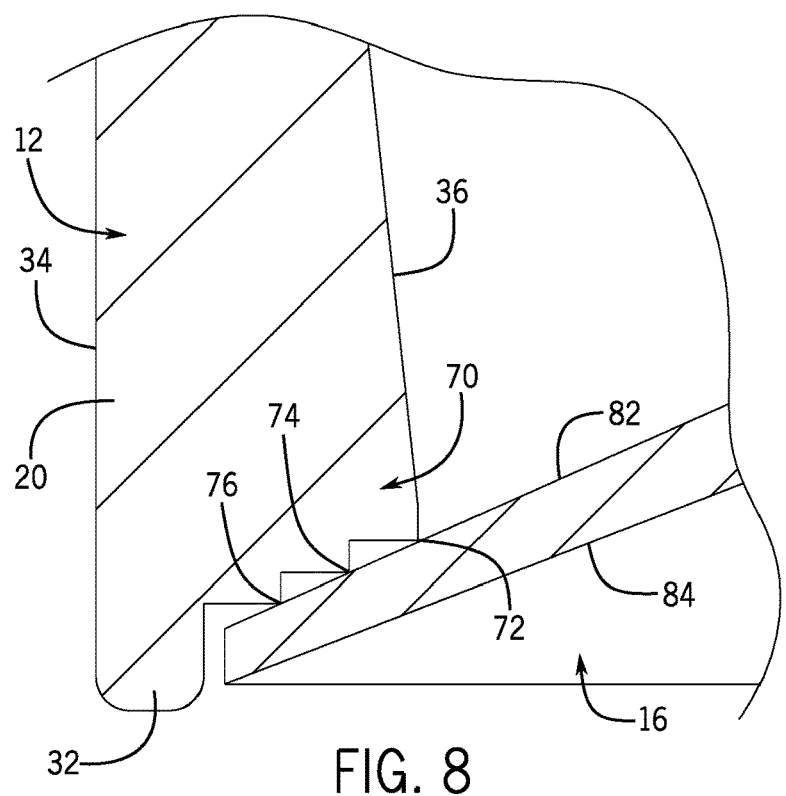
FIG. 8 is a detailed cross-sectional side view of the housing and seal member illustrating the triple seal between the seal member and the three sealing teeth of the lower peripheral lip of the housing.
Figure 14:
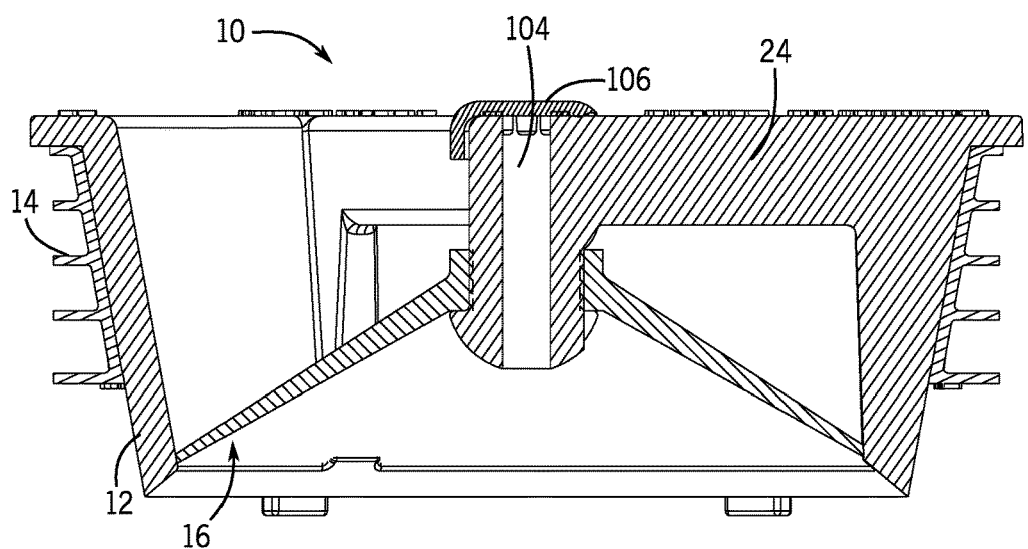
FIG. 14 is a cross-sectional side view of a waterless trap of FIG. 13 having the single central air exchange passage.

With specific reference to FIG. 8, these sealing teeth 70 are illustrated forming seals with the upper surface 82 of the skirt 80 of the seal member 16. Notably, the seal member 16 forms not only a single seal with the lower peripheral lip 32, but forms a number of seals (here, three seals) at each of the circumferential lines of contact between the upper surface 82 of the skirt 80, the seal member 16, and each of the three circumferential steps 72, 74, and 76. Thus, multiple seals can be formed using a single seal member whereas, conventionally, a seal member of this type would only form a single seal line. This means that the overall quality of the seal formed at this location, comprising the multiple stacked separate seals, may be more robust and less prone to leakage than a single seal line. This design can also help to alleviate gaps in a gas seal of this type to axial misalignment of the seal member. While the illustrated embodiment shows a plurality of seals, it should be appreciated that waterless traps containing a single sealing tooth 70 are also capable of use with embodiments of the present disclosure. Additionally, in some embodiments, there may be no sealing teeth. In such embodiments, a seal may be formed by contact between the upper surface 82 of the skirt 80 and the radially inward facing wall 36 of the housing 12, as can be seen in FIG. 14.

It will be appreciated that when water enters the trap, it flows over the upper surface 82 of the skirt 80 of the seal member 16 (after potentially being directed by the blades 24), into the region of the seals. The weight of the water can permit some downward deflection of the skirt 80 to permit the seals between the seal member 16 and the sealing teeth 70 to be broken, thereby permitting water to pass through the trap 10 and into the drain line. However, when water is not present, the skirt 80 of the seal member 16 is pressed back against the sealing teeth 70 to form the evaporation or gas seal.

In some instances, however, it can be difficult for the seal member 16 to open to permit water passage because gas between the p-trap and the trap 10 needs to be slightly compressed to permit the seal member 16 to open. To improve the ease with which the seal can open under drainage conditions, an air exchange system is also present in the trap 10 which is located in the central post 22 between where the stem 78 of the seal member 16 connects to a lower extent 88 of the central post 22.

Figure 9:
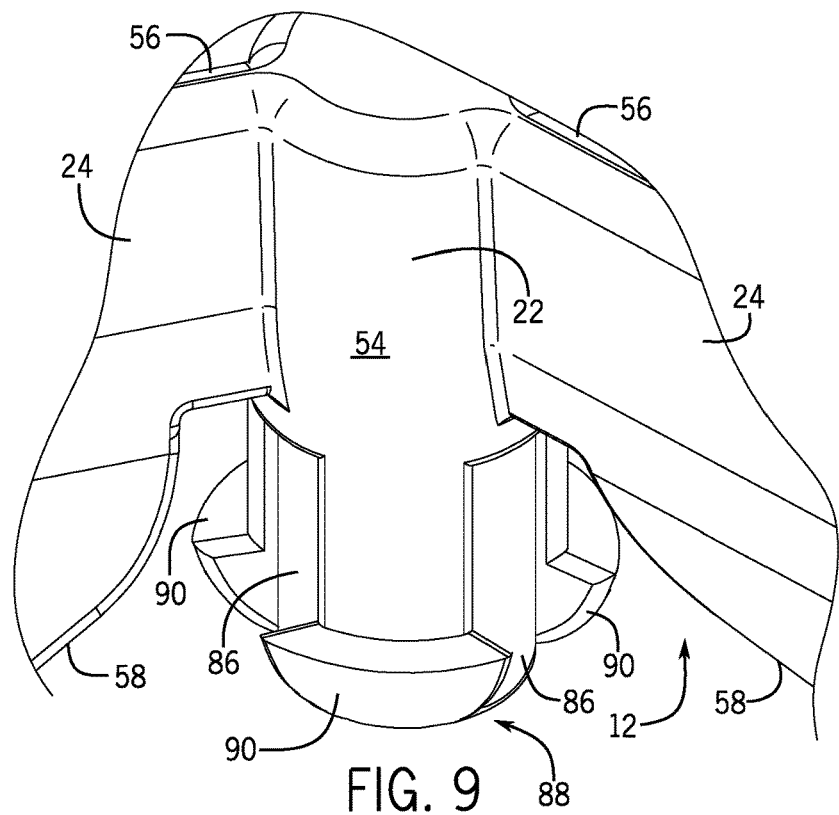
FIG. 9 is a detailed top side perspective view of a central post of the housing having three air exchange passages formed therein.
Figure 10:
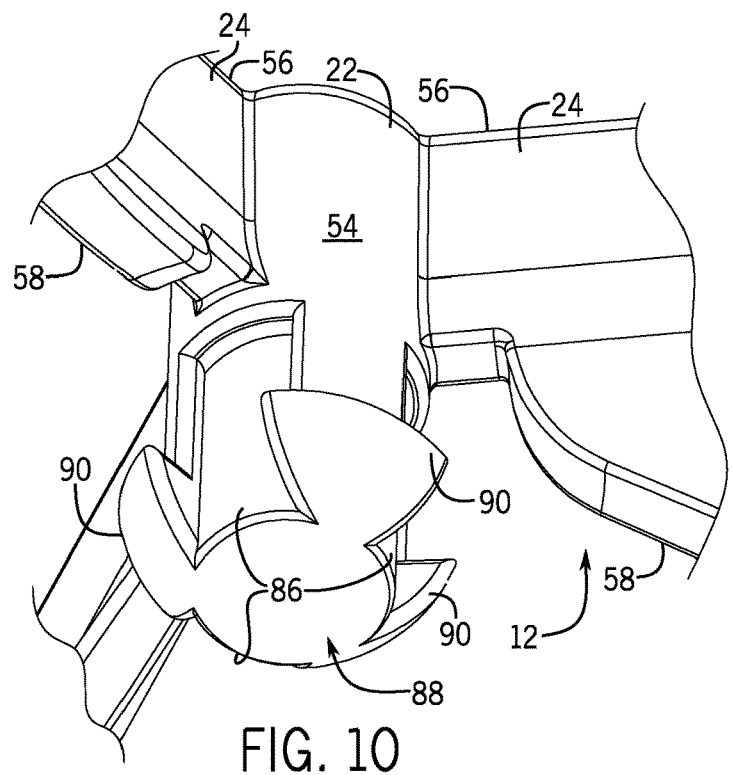
FIG. 10 is a bottom side perspective view of the central post having the three air exchange passages formed therein.
Figure 11:
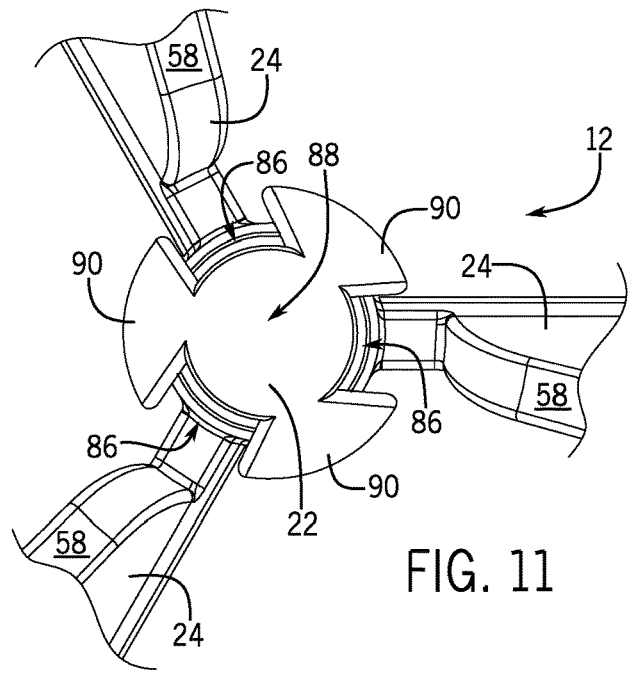
FIG. 11 is a bottom plan view of the central post having the three air exchange passages formed therein.

Turning now to FIGS. 9-11, a plurality of air exchange passages 86 are best shown which can help the seal open. These air exchange passages 86 are formed in the lower extent 88 of the central post 22 of the housing 12 below where the blades 24 connect to the central post 22. These air exchange passages 86 extend axially from a plurality of projections 90 (which are used to retain the seal member 16 in place after the opening 92 of the stem 78 is received on the lower extent 88 of the central post 22) to a location above the top of the stem 78. Thus, these air exchange passages 86 can provide selective communication from a volume in the housing 12 below the seal member 16 to a volume in the housing 12 above the seal member 16. In the particular form illustrated, because the stem 78 surrounds the lower extent 88 of the central post 22 and because the air exchange passages 86 in the central post 22 are effectively recesses formed in the post 22, an inwardly facing wall 94 of the opening 92 of the stem 78 of the seal member 16 further defines a portion of the air exchange passages 86.

Figure 12:
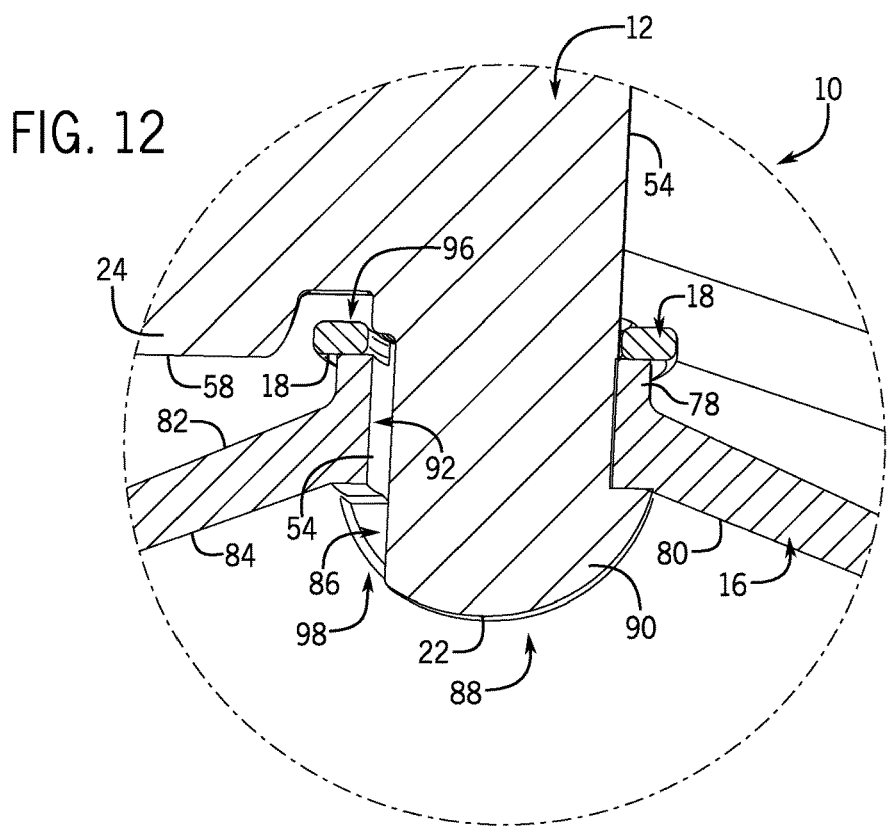
FIG. 12 is a detailed cross-sectional view of the assembled waterless trap in the region of the central post in which the O-ring and the seal member are received on the central post.

With additional reference to FIG. 12, the O-ring 18 is received around the top of the seal member 16 to selectively seal upper outlets 96 of the air exchange passages 86. This O-ring 18 may be plastic and be split to better accommodate angular expansion or flexure of the O-ring 18. As can be seen in FIG. 12, the O-ring 18 can form seals between the O-ring 18 and the upper surface of the stem 78 of the seal member 16 and between the O-ring 18 and the radially outward facing surface 54 of the central post 22. However, it should be appreciated that some embodiments of the present disclosure do not include O-ring 18.

In FIG. 12, a cross-sectional view of the waterless trap 10 is shown in the region of the air exchange passages 86 to show how that structure can be used to permit controlled escape of gas from between the water line in the p-trap and the bottom side of the trap 10 to improve the ease with which the seal between seal member 16 and the housing 12 can be opened. In short, under drainage conditions, pressurized gas from the lower volume can travel up the air exchange passages 86 between the central post 22 and the stem 78 from an inlet 98 to the corresponding outlet 96 and bleed past the O-ring 18. When the lower volume of the trap is above atmospheric pressure, this can help to release some gas to permit the trap seal between the skirt 80 of the seal member 16 and the sealing teeth 70 to open.

Figure 13:
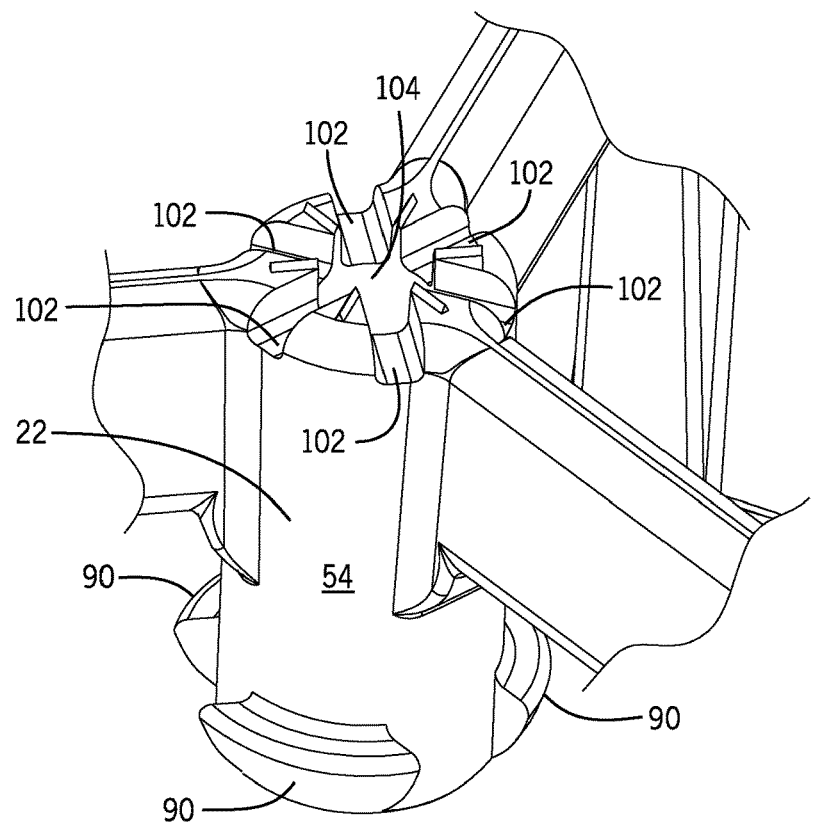
FIG. 13 is a top side perspective view of a central post of the housing of an alternative embodiment having a single central air exchange passage formed therein.

In FIGS. 13 and 14, an alternative embodiment of an air exchange system is shown. In addition to or instead of having multiple air passages 86 formed on the outer surface of the central post 22, a central air passage 104 can be formed in the central post 22. As illustrated, the central air passage 104 may be defined by an aperture or other opening extending from the top surface of the center post 22 through to the lower extent 88 of the central post. This provides selective communication from a volume in the housing 12 below the seal member 16 to a volume in the housing 12 above the seal member 16, even when a seal is formed by the seal member 16.

In some embodiments, the central air passage 104 can allow fluid to pass from below the seal member 16 to above the seal member 16 through one or more escape ports 102. The escape ports 102 may be located at various points throughout the central post 22, including at the top surface, as illustrated in FIG. 13. The escape ports 102 may be distributed evenly about the top of the central post 22, or may be spread throughout the central post 22 in a variety of shapes and locations. The escape ports 102 are in fluid communication with the central air passage 104 and extend radially away from the central air passage to the radially outward facing wall 54 of the central post 22.

In addition to the central air passage 104, some embodiments may further comprise a cap 106 as shown in FIG. 14. The cap 106 can be configured to receive a portion of the central post 22 and can be sized to sit on the top surface of the central post 22. The cap 106 may cover a portion of the central air passage 104. In some embodiments, the cap 106 includes slots which are sized to accommodate each of the blades 24, such that the cap 106 can securely sit directly on top of the central post 22. The cap 106 may also be sized to fit closely around the central post 22, as shown. The cap 106 may then limit certain types of fluid communication between the volume above the seal member 16 to the volume below the seal member 16, as it can prevent or at least inhibit the direct passage of water or other liquids directly through the central air passage 104. However, when gas from below the seal member 16 needs to be released, it can flow upwardly and axially through the lower extent 88 through the central air passage 104, then radially out the escape ports 102.

While the illustrated trap includes flow control blades, a multiple step seal, and an air exchange system in combination with one another, it will be appreciated that a waterless trap could potentially be made that utilizes some of these features, but not the others. For example, each of these features could be independently presented in a trap design and offer their respective benefits without including the other features. Likewise, different sub-combinations of these features could also be used together and are contemplated as falling within the scope of this disclosure.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A waterless trap comprising:
a housing having an outer peripheral wall, the outer peripheral wall having a radially inward facing wall, the housing further having a central post and a plurality of blades extending from the outer peripheral wall to the central post in which the plurality of blades are integrally formed with the central post and the outer peripheral wall;
a seal member having a stem received on the central post of the housing and a skirt extending radially outward and downwardly from the stem in which the skirt contacts the radially inward facing wall of the housing to form a seal therebetween; and
a cap configured to receive a portion of the central post, the cap being a separate component from the housing;
wherein the central post has a central air passage defined by an aperture extending through the central post from a top surface of the central post to a lower extent of the central post and wherein the cap is positioned to inhibit liquid flow from a volume of the housing above the seal member to a volume of the housing below the seal member.

2. The waterless trap of claim 1, wherein the central post comprises one or more escape ports extending radially outward from the central air passage and positioned in fluid communication with the central air passage.

3. The waterless trap of claim 2, wherein the top surface of the central post has the one or more escape ports and the cap sits on the top surface of the central post.

4. The waterless trap of claim 1, wherein the cap is further configured to sit at the top surface of the central post.

5. The waterless trap of claim 1, wherein the cap includes slots which are sized to accommodate each of the plurality of blades.

6. The waterless trap of claim 1, wherein the cap is positioned to cover a portion of the central air passage.

* * * * *